(12) United States Patent
Collier-Hallman et al.

(10) Patent No.: US 8,051,945 B2
(45) Date of Patent: Nov. 8, 2011

(54) ELECTRIC POWER STEERING SYSTEM, CONTROLLER, AND METHOD OF OPERATION

(75) Inventors: Steven J. Collier-Hallman, Frankenmuth, MI (US); Daniel W. Shafer, Saint Charles, MI (US)

(73) Assignee: Nexteer (Beijing) Technology Co., Ltd.

( * ) Notice: Subject to any disclaimer, the term of this patent is extended or adjusted under 35 U.S.C. 154(b) by 240 days.

(21) Appl. No.: 12/434,891

(22) Filed: May 4, 2009

(65) Prior Publication Data
US 2009/0288907 A1 Nov. 26, 2009

Related U.S. Application Data

(60) Provisional application No. 61/055,691, filed on May 23, 2008.

(51) Int. Cl.
*B62D 5/04* (2006.01)
(52) U.S. Cl. .................................... 180/446; 180/443
(58) Field of Classification Search ................ 180/443, 180/446
See application file for complete search history.

(56) References Cited

U.S. PATENT DOCUMENTS

| | | | | |
|---|---|---|---|---|
| 4,621,327 A * | 11/1986 | Dolph et al. | ............ | 701/43 |
| 4,660,671 A * | 4/1987 | Behr et al. | ............ | 180/446 |
| 4,765,426 A * | 8/1988 | Shimizu | ............ | 180/446 |
| 4,869,334 A * | 9/1989 | Marumoto et al. | ............ | 180/446 |
| 5,027,276 A * | 6/1991 | Morishita et al. | ............ | 701/43 |
| 5,150,021 A * | 9/1992 | Kamono et al. | ............ | 318/488 |
| 5,259,473 A * | 11/1993 | Nishimoto | ............ | 180/446 |
| 5,602,451 A * | 2/1997 | Kohge et al. | ............ | 318/293 |
| 6,078,155 A * | 6/2000 | Tominaga et al. | ............ | 318/293 |
| 6,439,336 B2 * | 8/2002 | Noro et al. | ............ | 180/404 |
| 6,577,030 B2 * | 6/2003 | Tominaga et al. | ............ | 310/68 B |
| 6,611,411 B2 * | 8/2003 | Williams et al. | ............ | 361/93.1 |
| 6,906,483 B2 * | 6/2005 | Tominaga et al. | ............ | 318/293 |
| 7,081,691 B2 * | 7/2006 | Kawata | ............ | 307/9.1 |
| 7,312,545 B2 * | 12/2007 | Sasaki et al. | ............ | 310/68 R |
| 7,852,023 B2 * | 12/2010 | Kifuku et al. | ............ | 318/139 |
| 2006/0066270 A1* | 3/2006 | Kumagai et al. | ............ | 318/139 |
| 2007/0068727 A1* | 3/2007 | Miura et al. | ............ | 180/446 |

FOREIGN PATENT DOCUMENTS

| | | |
|---|---|---|
| EP | 0337645 B1 | 10/1989 |
| EP | 0689986 A1 | 1/1996 |
| EP | 1737116 A1 | 12/2006 |
| JP | 2007099066 A | 4/2007 |

OTHER PUBLICATIONS

European Search Report and Office Action dated Sep. 3, 2009 for European Application No. 09160172.4.

* cited by examiner

*Primary Examiner* — Anne Marie Boehler
*Assistant Examiner* — Michael Stabley
(74) *Attorney, Agent, or Firm* — Cantor Colburn LLP

(57) ABSTRACT

An electric power steering system for a vehicle includes a motor for providing assistance in turning the wheels of the vehicle. The motor is electrically connected to a controller. The controller includes a power device, such as a power transistor, electrically connected to the motor to variably provide electric power to the motor as needed. The controller also includes a gate drive device electrically connected to the power device for regulating operation the power device. A shutdown mechanism is electrically connected between the gate drive device and a power input. In the event of a fault, the shutdown mechanism isolates electrical power from the gate drive device. This prevents the power device from providing electric power to the power steering motor.

18 Claims, 7 Drawing Sheets

ELECTRIC POWER STEERING SYSTEM, CONTROLLER, AND METHOD OF OPERATION

CROSS REFERENCE TO RELATED APPLICATION

This application claims the benefit of provisional patent application No. 61/055,691, filed May 23, 2008, which is hereby incorporated by reference.

BACKGROUND OF THE INVENTION

1. Field of the Invention

The invention relates to electric power steering systems. Specifically, the invention relates to disconnecting power from a motor of an electric power steering system.

2. Description of the Related Art

Modern vehicles typically offer power steering systems to aid the driver in turning the wheels of the vehicle via the steering wheel. This assistance is most often needed at slow or stopped vehicle speeds. Conversely, very little assistance is needed when the vehicle is traveling at higher speeds.

Conventional power steering is accomplished using hydraulic mechanisms. However, electric power steering systems have recently become more commonplace. Electric power steering systems include an electric motor operatively connected to the wheels of the vehicle to provide assist when the driver turns the steering wheel. The amount of electrical power provided to the electric motor is typically varied based on a number of factors, including, but not limited to, the speed of the vehicle. A control diagram for such a prior art system can be seen in FIG. 1.

In case of a fault in the electric power steering systems, it is often necessary and prudent to disconnect all electric power from the electric motor, thus resulting in manual steering of the vehicle. This disconnection of power from the electric motor in the prior art is accomplished by one or more relays, as can be seen in prior art FIGS. 1 and 2. More specifically, as shown in FIG. 2, a disconnect relay is electrically connected between a power input and at least one power device.

Unfortunately, this prior art system has numerous shortcomings. For instance, the resistance from the relay contacts is undesirable as they provide a source of power loss in the system. Furthermore, the electromechanical relays are physically large and expensive due to the large amount of current they need to carry, as well as often being unreliable. Moreover, multiple (redundant) battery measurement is required on both sides of the relay to ensure proper operation.

The present invention attempts to solve these and other problems of prior art electric power steering systems.

SUMMARY OF THE INVENTION AND ADVANTAGES

The subject invention provides an electric power steering system for a vehicle. The system includes an electric power steering motor operatively connected to at least one wheel of the vehicle for assisting in turning the at least one wheel of the vehicle. At least one power device is electrically connected to a power input for receiving electrical power and to the motor for providing electrical power to the motor. The system also includes a gate drive device electrically connected to the at least one power device for regulating operation of the at least one power device. A shutdown mechanism is electrically connected between the gate drive device and the power input. The shutdown mechanism isolates electrical power from the gate drive device in response to a shutdown condition to prevent the at least one power device from providing electric power to the power steering motor.

By implementing the shutdown mechanism between the power input and the gate drive device, several advantages are achieved over prior art systems. First, because of the relatively small size of a bypass capacitor (not shown), electric power is removed from the at least one power device very quickly once one of the enable signals is removed. Furthermore, electric energy generated by the motor may flow back to a battery of the vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
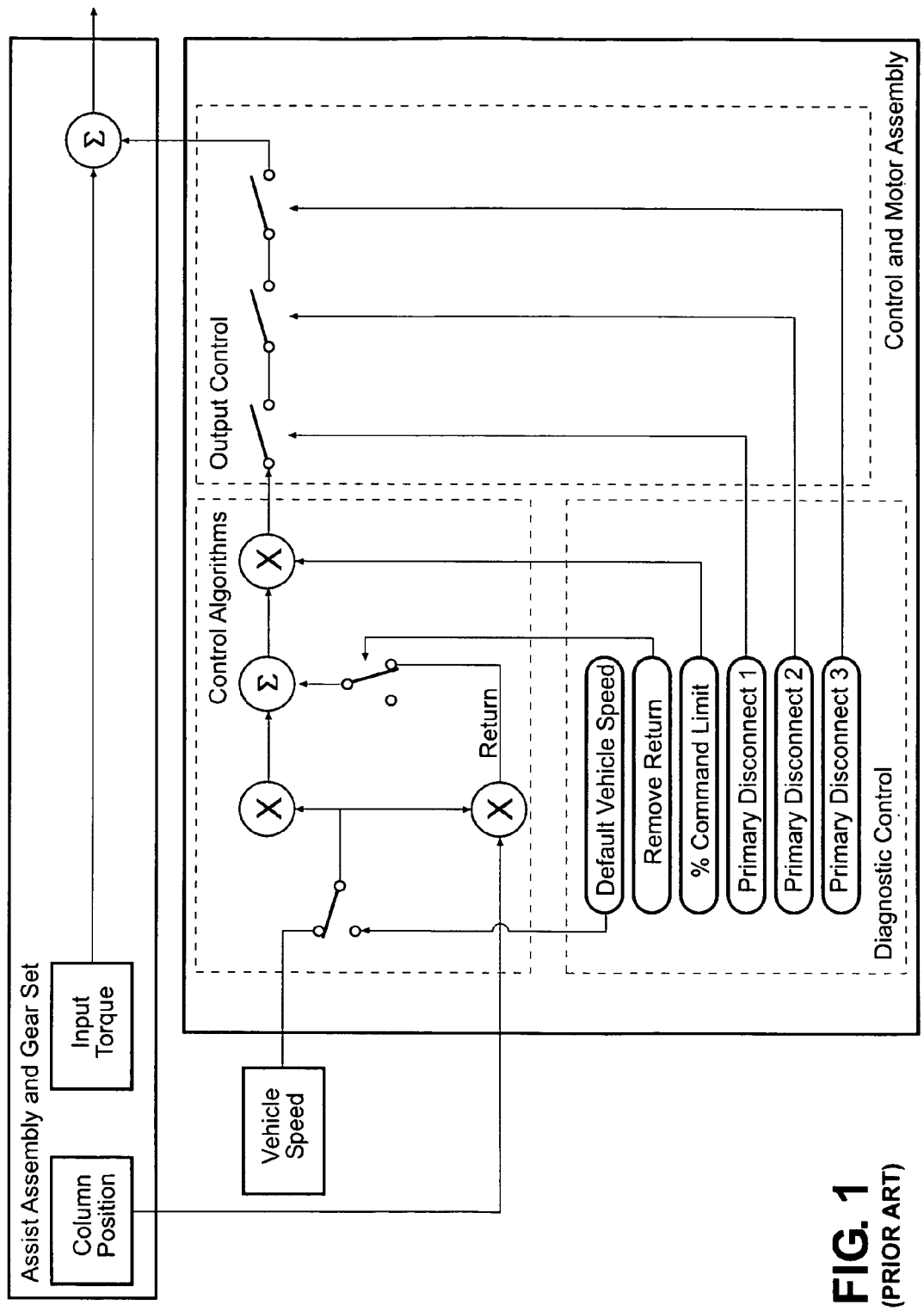
FIG. 1 is a control diagram showing operation of a conventional electric power steering system of the prior art.
Figure 2:
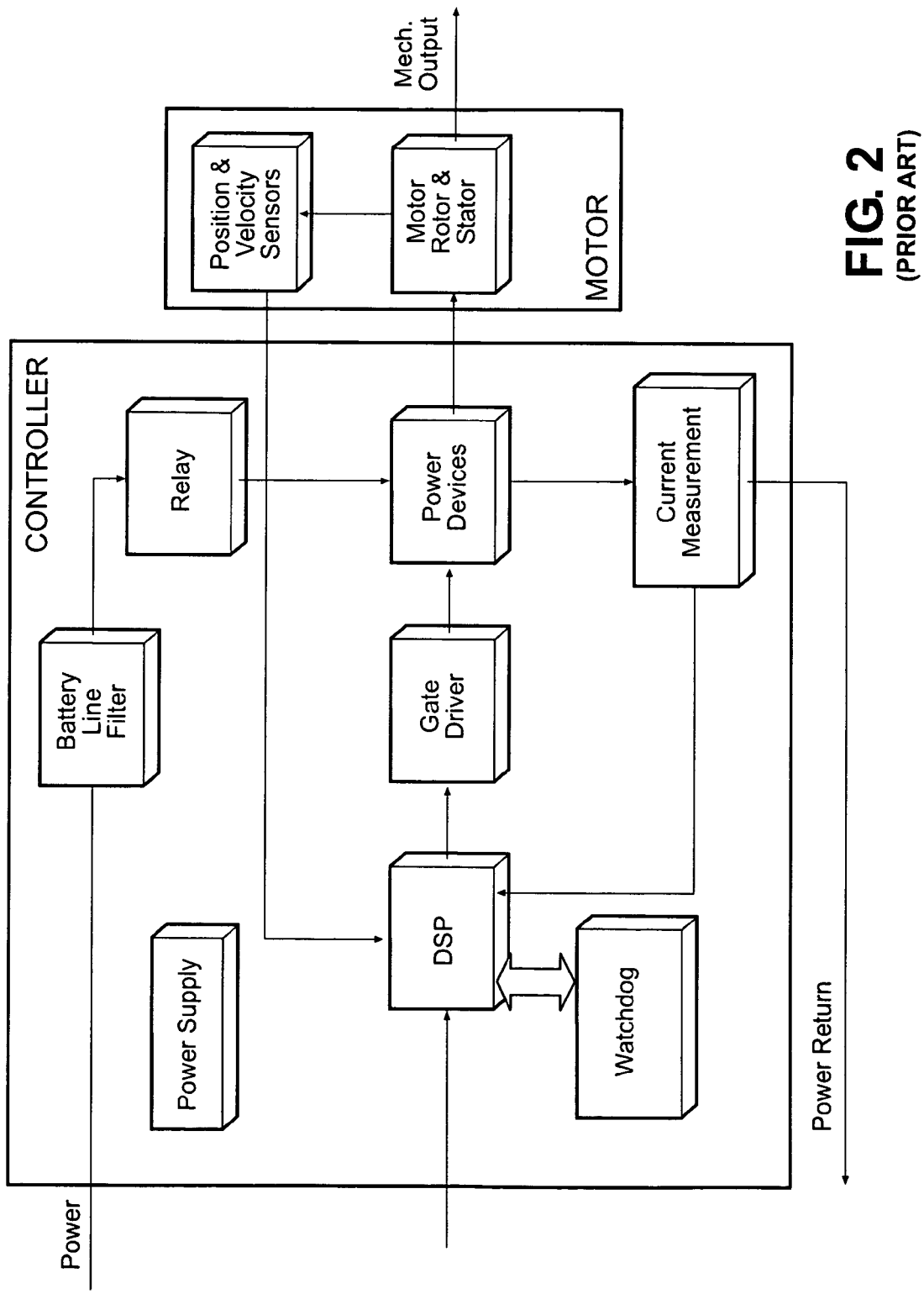
FIG. 2 is an electrical block diagram of the conventional electric power steering system of the prior art showing a disconnect relay disposed between a power input and at least one power device.
Figure 3:
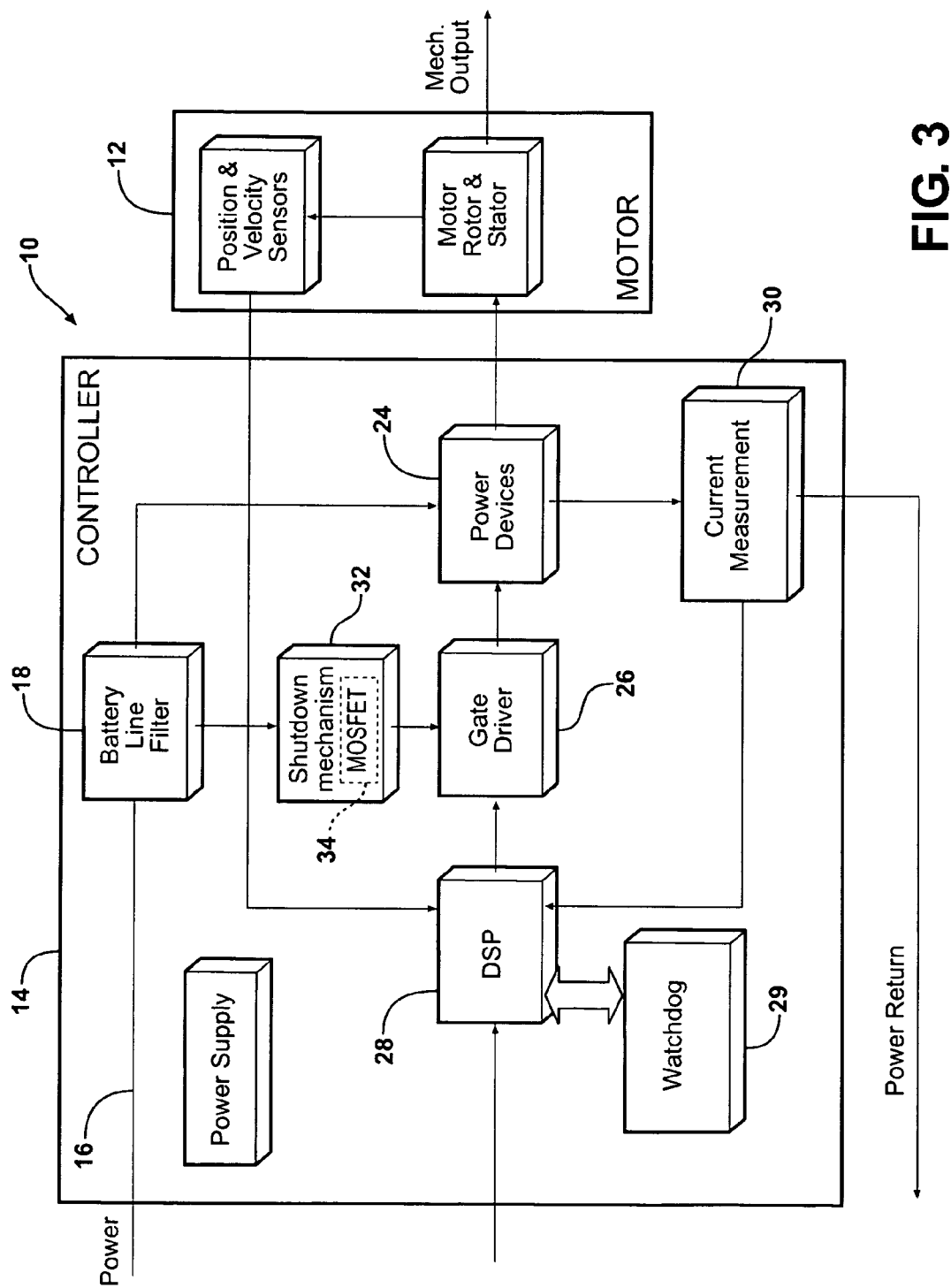
FIG. 3 is an electrical block diagram of a first embodiment of an electric power steering system of the present invention showing a shutdown mechanism having a MOSFET disposed between a power input and a gate drive device.

Referring to Figures, wherein like numerals indicate like parts throughout the several views, an electric power steering system 10 for a vehicle is shown. With reference to FIG. 3, the system 10 includes an electric power steering motor 12 for providing assistance in turning a steering wheel (not shown) of the vehicle by reducing the amount of effort that must be exerted by the driver. The system 10 also includes a controller 14 for controlling the electrical power supplied to the motor 12.

The controller 14 includes a power input 16 for receiving electrical power. Typically, the electrical power is supplied by one or more batteries (not shown) and has a voltage of about 12 V. However, those skilled in the art realize other sources of the electrical power in the vehicle may be implemented and that other voltages may alternatively be suitable.

Figure 6:
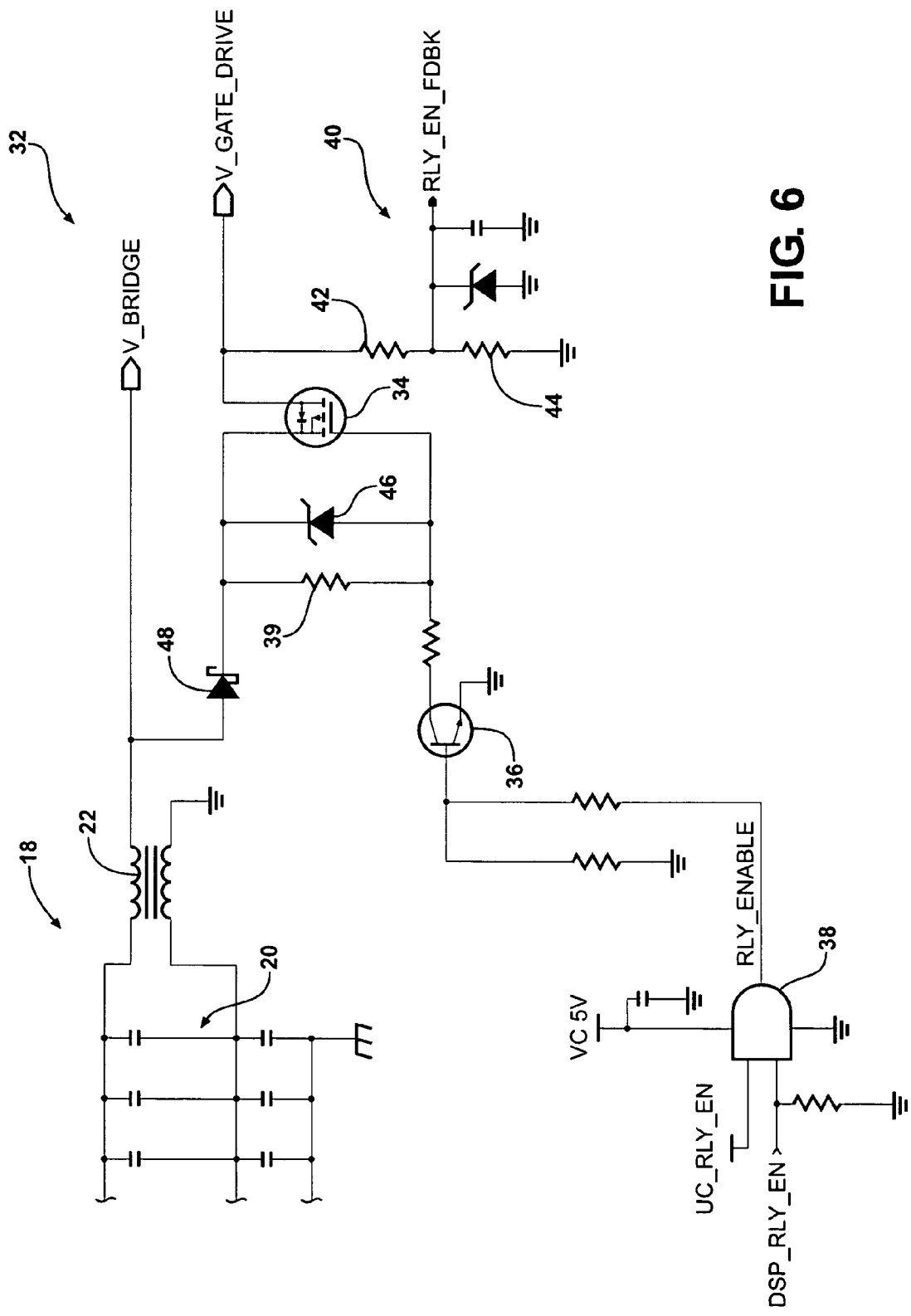
FIG. 6 is a detailed electrical schematic of the shutdown mechanism of the first embodiment of the present invention.

The controller 14 may include a battery line filter 18 electrically connected to the power input 16. The battery line filter 18 protects the controller 14 from surges or other electrically anomalies. In an illustrated embodiment, as shown in FIG. 6, the battery line filter 18 preferably includes a plurality of capacitors 20 and an inductor 22. However, those skilled in the art realize other suitable embodiments to implement the battery line filter 18.

Figure 5:
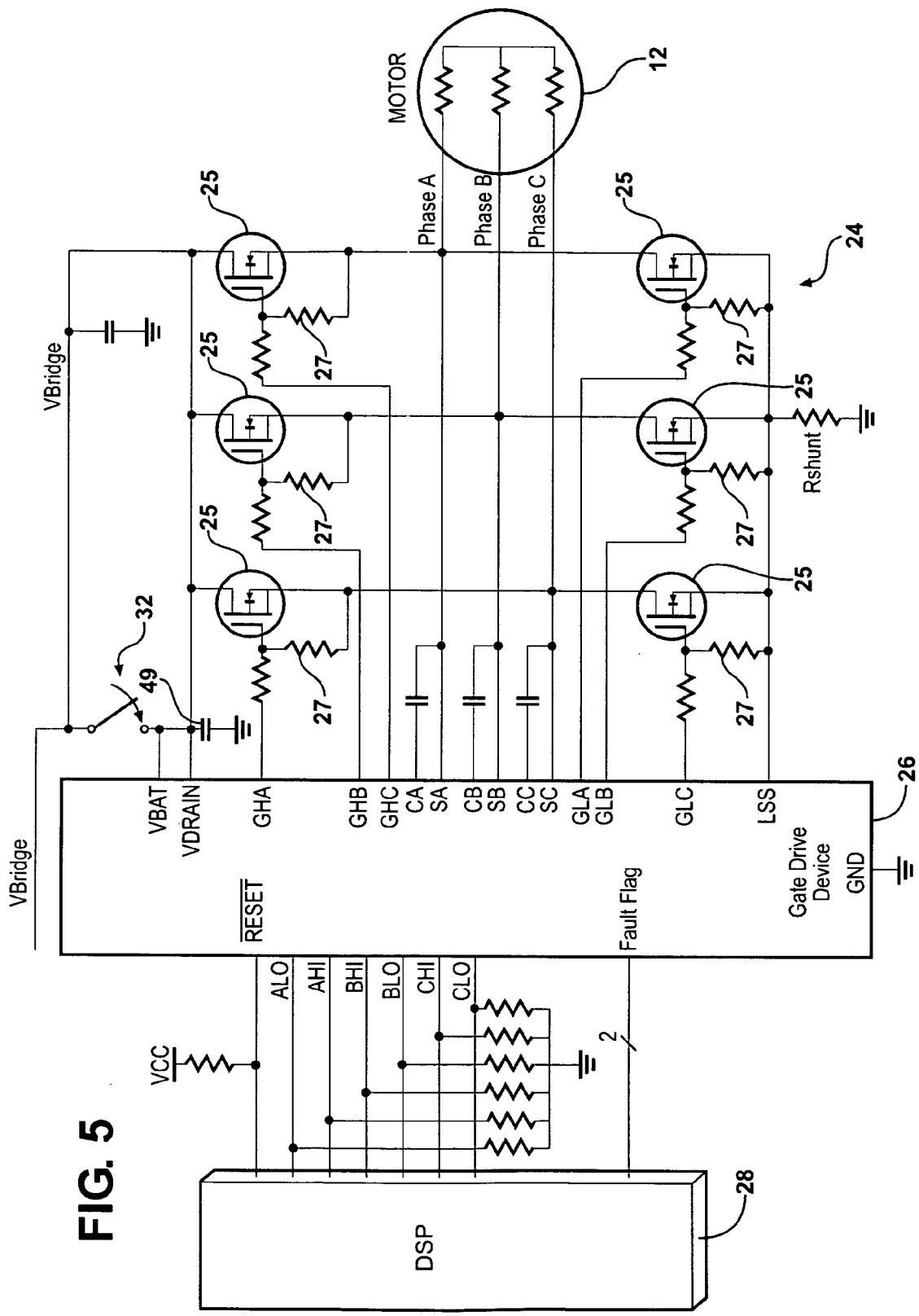
FIG. 5 is an electrical schematic of part of the system showing a plurality of MOSFETs implemented as the at least one power device.

Referring to FIG. 3, the controller 14 also includes at least one power device 24 electrically connected to the power input 16. Specifically, in the illustrated embodiment, the at least one power device 24 is electrically connected to the battery line filter 18. The at least one power device 24 is also electrically connected to the electric power steering motor 12. In operation, the at least one power device receives electrical power and variably provides the electrical power to the electric power steering motor. The at least one power device 24 is preferably implemented as a plurality of power transistors 25, as shown in FIG. 5. More specifically, the power transistors 25 may be power MOSFETs. However, other devices for implementing the at least one power device 24 may utilized in the alternative.

The controller 14 further includes a gate drive device 26 electrically connected to the at least one power device 24 for regulating operation of the at least one power device 24. The power transistors 25 of the at least one power device 24 inherently enter a high impedance state, i.e., a shutdown state, if the gate of the power transistors falls below a threshold turn-on voltage. As such, in normal operation, the gate drive device 26 supplies the necessary gate voltage of the power transistors 25 above a threshold turn-on level.

The gate drive device 26 also regulates the amount of electric power provided to the at least one power device 24, and thus to the motor 12, in a variable fashion. This variation in power changes the amount of power steering assist provided by the motor 12 depending on certain vehicle conditions, as described further below.

The controller 14 further includes a plurality of gate discharge resistors 27. When the power devices 24 are implemented as n-channel MOSFETs, each gate discharge resistor 27 is electrically connected between the source and the gate of the MOSFET. When the gate of the MOSFET goes high impedance, the gate discharge resistor 27 assists in discharging the MOSFET, thus disconnecting power from the motor 12. However, the power devices 24 may alternative be implemented as p-channel MOSFETs. In such implementations, the p-channel MOSFETs disconnect power from the motor 12 when a pull-up resistor (not shown) charges the MOSFET gate when the gate of the MOSFET goes high impedance.

The controller 14 also includes a processor 28 electrically connected to the gate drive device 26 for controlling the gate drive device 26. Control of the gate drive device 26 is based on at least one signal input to the processor 28 for regulating the amount of power supplied by the at least one power device 24 to the power steering motor 12. The processor 28 is preferably a digital signal processor (DSP) as is well known to those skilled in the art.

As described above, the processor 28 may include one or more signal inputs that are used for determining the amount of power to be supplied to the power steering motor. These inputs may include, but are not limited to, the electric current flowing through the at least one power device 24, the speed (velocity) of the motor 12, the positioning of a rotor of the motor 12, and the speed (velocity) of the vehicle.

The controller 14 may also include a watchdog unit 29 for monitoring the operational status of the processor 28. The watchdog unit 29 is preferably a microprocessor electrically connected to the processor 28.

To provide a signal corresponding to the current flowing through the at least one power device 24, the controller 12 may include a current sensor 30 electrically connected to the at least one power device. The current sensor 30 is in communication with the processor 28. More specifically, in the illustrated embodiment, the current sensor 30 is electrically connected to the processor 28.

The controller 14 further includes a shutdown mechanism 32. The shutdown mechanism 32 is electrically connected between the gate drive device 26 and the power input 16. More specifically, in the illustrated embodiment, the shutdown mechanism 32 is electrically disposed between the battery line filter 18 and the gate drive device 26. The shutdown mechanism 32 isolates electrical power from the gate drive device 16 in response to a shutdown condition. The shutdown condition could be a system fault as well known to those skilled in the art. This electrical disconnection of the gate drive device 16 prevents the at least one power device 24 from providing electric power to the power steering motor 12.

In a first embodiment, as shown in FIG. 6, the shutdown mechanism 32 includes a metal-oxide semiconductor field effect transistor (MOSFET) 34. The MOSFET 34 of the first embodiment is implemented as a p-channel MOSFET. One suitable device for implementing the MOSFET 34 is a model number FDN5618P device, manufactured by Fairchild Semiconductor Corporation of South Portland, Me. and San Jose, Calif. The FDN5618P is a 60 V p-channel power MOSFET. Of course, other suitable devices may be implemented as the MOSFET 34. Furthermore, in other embodiments, the shutdown mechanism 32 may include alternative devices, other than the MOSFET 34, to provide switching of electric current, as described in further detail below.

The MOSFET 34 of the first embodiment has a source (not labeled) electrically connected to the battery line filter 18, and thus electrically connected to the power input 16. A drain (not labeled) of the MOSFET 34 is electrically connected to the gate drive device 26. A gate (not labeled) of the MOSFET 34 receives an enable signal, which controls the switching of electric current by the MOSFET 34 between the source and the drain.

Figure 4:
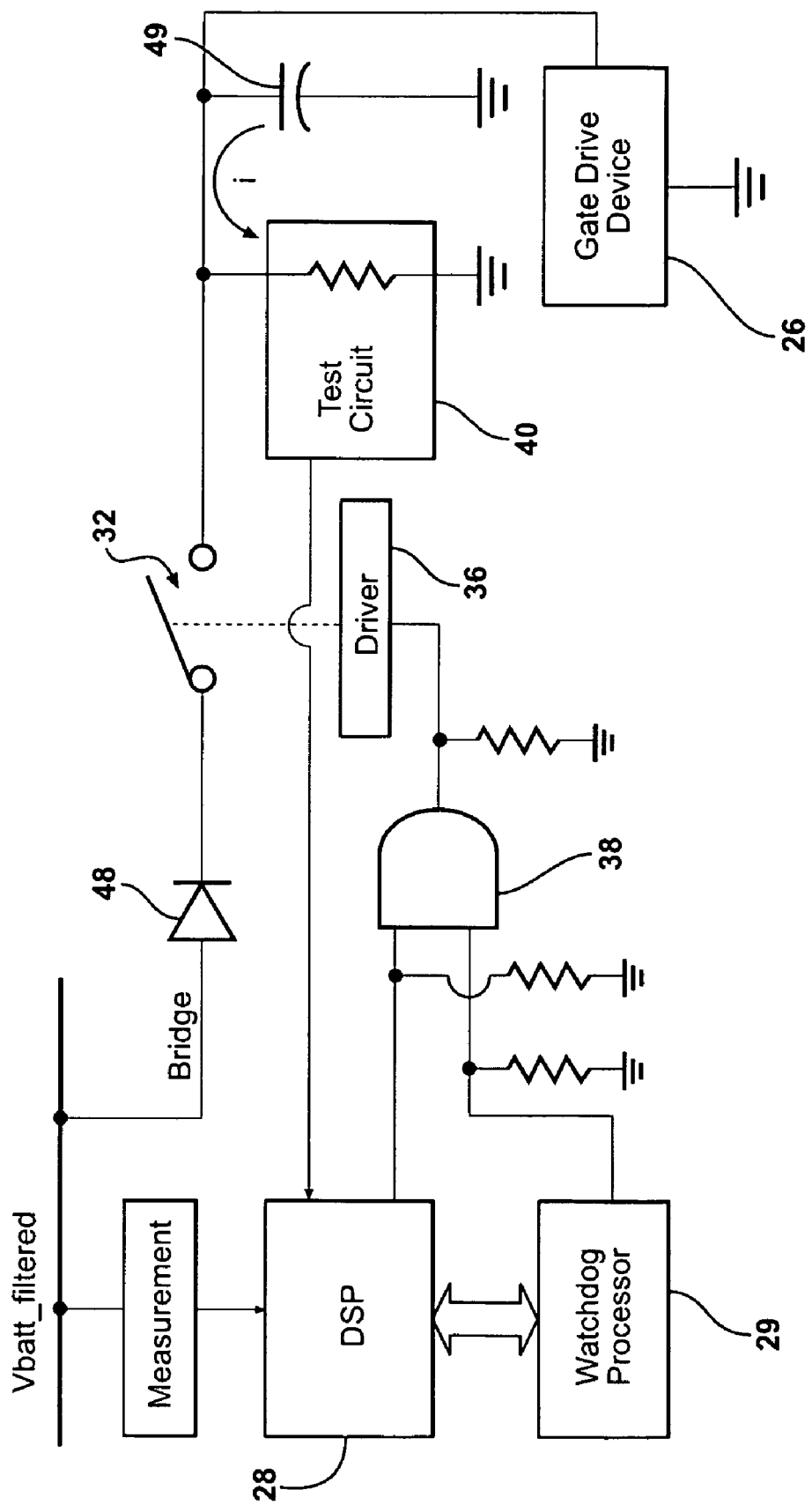
FIG. 4 is an electrical schematic of part of a controller of the system showing an interface between a processor, the shutdown mechanism, and a gate drive device.

The shutdown mechanism 32 of the first embodiment also includes a bipolar junction transistor (BJT) 36 electrically connected to the MOSFET 34. Specifically, the BJT 36 is an NPN-type transistor. In the first embodiment, an AND gate 38 is electrically connected to a base (not labeled) of the BJT 36 for activating the BJT 36. With this configuration, a pair of enabling inputs must both be active to prevent the MOSFET 34 from disconnecting power from the gate drive device 26. These enabling inputs to the AND gate 38 may be produced by different signal sources or a common signal source. In the first embodiment, as shown in FIGS. 4 and 6, one input is provided by the processor 28 and the other input is provided by the watchdog unit 29. However, in other embodiments, the shutdown mechanism 32 could be implemented without the AND gate 38 to require only one enabling input for the MOSFET 34.

A collector (not labeled) of the BJT 36 is electrically connected to the gate of the MOSFET 34. An emitter (not labeled) of the BJT 36 is electrically connected to ground. When activated, the BJT 36 grounds the gate of the MOSFET 34, forcing the MOSFET 34 p-channel to allow the flow of current to the gate drive device 26. In turn, the gate drive device 26 operates normally, allowing the power transistors of the at least one power devices 24, to provide power to the electric motor 12.

The shutdown mechanism 32 of the first embodiment further includes a gate charge resistor 39. The gate charge resistor 39 is electrically connected between the source and the gate of the MOSFET 34. When the input to the gate of the MOSFET 34 goes high impedance, the gate charge resistor 39 assists in positively charging the MOSFET 34 gate, thus removing the MOSFET 34 p-channel and disconnecting power from the gate drive device 26 and the at least one power device 24. The gate charge resistor 39 may also commonly be referred to as a pull-up resistor.

Referring to FIGS. 4 and 6, the shutdown mechanism 32 of the first embodiment also includes a test circuit 40 for testing whether the MOSFET 34 is functioning properly before normal operation of the MOSFET 34. The test circuit 40 implements a voltage divider with a pair of resistors 42, 44 electrically connected to the drain of the MOSFET 34 as shown specifically in FIG. 6.

The shutdown mechanism 32 of the first embodiment further includes a Zener diode 46 electrically connected between the source and the gate of the MOSFET 34. The Zener diode 46 provides load dump protection for the MOSFET 34. Specifically, the Zener diode 46 protects the MOSFET 34 by ensuring that the gate-to-source voltage does not exceed its rated value.

The shutdown mechanism 32 may also include a Schottky diode 48 electrically connected between the power input 16 and the gate drive device 26. In the first embodiment, the Schottky diode 48 is electrically connected between the inductor 22 of the battery line filter 18 and the source of the MOSFET 34. The Schottky diode 48 prevents a back flow of current to the one or more batteries electrically connected to the power input 16.

The shutdown mechanism 32 may further include a gate drive bypass capacitor 49. This bypass capacitor 49 is electrically connected between the test circuit 40 and the gate drive device 28, as shown in FIG. 4. The bypass capacitor 49 preferably has a capacitance of about 10 µF. However, other sizes for the bypass capacitor 49 will be realized by those skilled in the art.

By implementing the shutdown mechanism 32 between the power input 16 and the gate drive device 26, several advantages are achieved over prior art systems. First, the bypass capacitor 49 is sized relatively small (e.g., 10 µF) when compared to a bulk capacitor of the converter, which is on the order of 10,000 µF. As such, electric power is removed from the at least one power device 24 very quickly once one of the enable signals is removed, typically on the order of 10 ms. The processor 28 and test circuit 40 may be utilized to measure the speed of this discharge, to verify proper function.

Furthermore, electric energy generated by the motor 12 (e.g., due to the turning of the wheels and/or the steering wheel) may flow back to the battery. As such, electric power is effectively scavenged from the electric power steering system 10. This effect is increasingly important in electric and hybrid electric vehicles.

Figure 7:
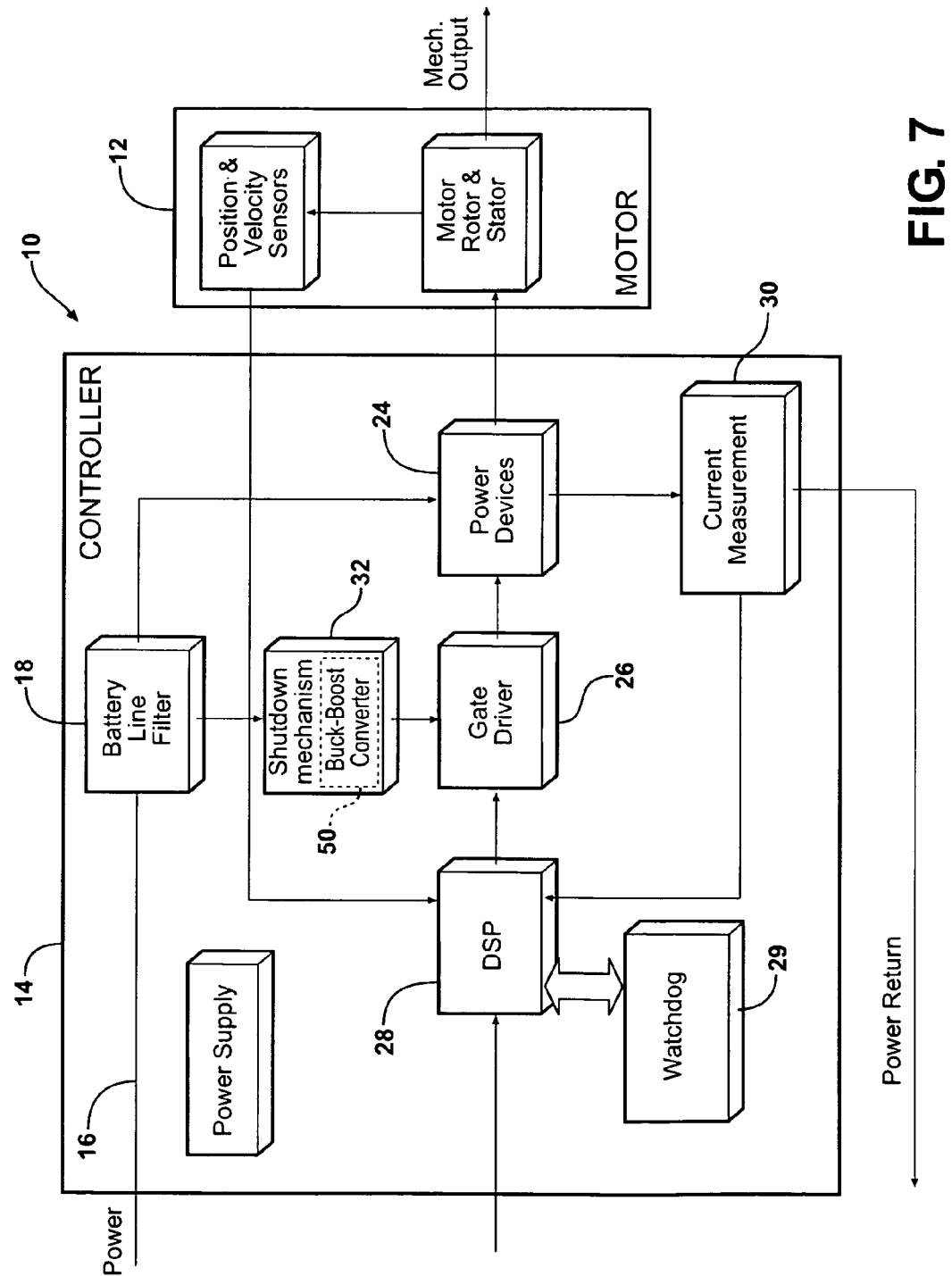
FIG. 7 is an electrical block diagram of a second embodiment of the electric power steering system of the present invention showing a shutdown mechanism having a buck-boost converter disposed between the power input and the gate drive device.

As mentioned above, the shutdown mechanism 32 may be implemented with devices other than the p-channel MOSFET 34. For example, in a second embodiment, the shutdown mechanism 32 could alternatively include a controlled buck-boost converter 50, as shown in FIG. 7. The buck-boost converter 50 boosts the voltage to the gate drive device while being able to disconnect power to the date drive device. Boosting the voltage provides a more efficient operation of the power transistors of the at least one power device 24 during a low voltage event. Furthermore, buck-boost converters can transmit power through an inductor or capacitor. Therefore, if a power device in the buck-boost converter fails 50, it stops transmitting power to the gate drive device 26 and the at least one power device 24.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An electric power steering system for a vehicle comprising:
an electric power steering motor operatively connected to at least one wheel of the vehicle for assisting in turning the at least one wheel of the vehicle;
at least one power device electrically connected to a power input for receiving electrical power and to said motor for providing electrical power to said motor;
a gate drive device electrically connected to said at least one power device for regulating operation of said at least one power device; and
a shutdown mechanism electrically connected between said gate drive device and said power input for isolating electrical power from said gate drive device in response to a shutdown condition to prevent said at least one power device from providing electric power to the power steering motor, said shutdown mechanism including a MOSFET having a source electrically connected to said power input, a drain electrically connected to said gate drive device, and a gate for receiving an enable signal.

2. A system as set forth in claim 1 further comprising a gate charge resistor electrically connected between said source of said MOSFET and ground for deactivating said MOSFET.

3. A system as set forth in claim 1 further comprising a Zener diode electrically connected between said source and said gate of said MOSFET.

4. A system as set forth in claim 1 wherein said shutdown mechanism further includes an AND gate having inputs for receiving enabling signals and an output.

5. A system as set forth in claim 4 wherein said shutdown mechanism further includes a bipolar junction transistor (BJT) having a base electrically connected to said output of said AND gate, a collector electrically connected to said gate of said MOSFET, and an emitter electrically connected to ground.

6. A system as set forth in claim 1 wherein said shutdown mechanism further includes a test circuit electrically connected to said MOSFET for testing whether said MOSFET is functioning properly.

7. A system as set forth in claim 6 wherein said test circuit further comprises a pair of resistors electrically connected to said drain of said MOSFET as a voltage divider.

8. A system as set forth in claim 1 wherein said shutdown mechanism further includes a capacitor electrically connected to said drain of said MOSFET.

9. A system as set forth in claim 1 further comprising a Schottky diode electrically connected between said power input and said gate drive device for providing protection to a battery electrically connected to said power input.

10. A system as set forth in claim 1 further comprising a processor electrically connected to said gate drive device for controlling said gate drive device based on at least one input to regulate the amount of power supplied by said at least one power device to said power steering motor.

11. A system as set forth in claim 10 further comprising a current sensor electrically connected to said at least one power device and in communication with said processor for supplying said processor with a signal corresponding to an amount of current flowing through said at least one power device.

12. A system as set forth in claim 1 wherein said at least one power device is further defined as a plurality of power transistors.

13. A system as set forth in claim 12 further comprising a plurality of gate discharge resistors wherein each gate discharge resistor is electrically connected between one of said plurality of power transistors and ground for deactivating said plurality of power transistors.

14. An electric power steering system for a vehicle comprising:
   an electric power steering motor operatively connected to at least one wheel of the vehicle for assisting in turning the at least one wheel of the vehicle;
   at least one power device electrically connected to a power input for receiving electrical power and to said motor for providing electrical power to said motor;
   a gate drive device electrically connected to said at least one power device for regulating operation of said at least one power device; and
   a shutdown mechanism electrically connected between said gate drive device and said power input for isolating electrical power from said gate drive device in response to a shutdown condition to prevent said at least one power device from providing electric power to the power steering motor, said shutdown mechanism including a buck-boost converter electrically connected to said power input and said gate drive device.

15. A controller for an electric power steering system having an electric power steering motor, said controller comprising:
   a power input for receiving electrical power;
   at least one power device electrically connected to said power input for receiving electrical power;
   said at least one power device electrically connectable to the power steering motor for variably providing electrical power to the motor;
   a gate drive device electrically connected to said at least one power device for regulating operation of said at least one power device; and
   a shutdown mechanism electrically connected between said gate drive device and said power input for isolating electrical power from said gate drive device in response to a shutdown condition to prevent said at least one power device from providing electric power to the power steering motor, said shutdown mechanism including a buck-boost converter electrically connected to said power input and said gate drive device.

16. A controller as set forth in claim 15 wherein said shutdown mechanism includes a MOSFET having a source electrically connected to said power input, a drain electrically connected to said gate drive device, and a gate for receiving an enable signal.

17. A controller as set forth in claim 16 further comprising a gate charge resistor electrically connected between said source of said MOSFET and ground for deactivating said MOSFET.

18. A controller as set forth in claim 15 further comprising a processor electrically connected to said gate drive device for controlling said gate drive device based on at least one input to regulate the amount of power supplied by said at least one power device to the power steering motor.

* * * * *